Patented June 28, 1949

2,474,342

UNITED STATES PATENT OFFICE 2,474,342

HYDROCARBON OIL COMPOSITIONS

David W. Young, Roselle, and Paul W. Brakeley, Jr., Plainfield, N. J., assignors to Standard Oil Development Company, a corporation of Delaware No Drawing. Application September 16, 1947, Serial No. 774,434

2 Claims. (Cl. 252—52)

This invention relates to novel hydrocarbon oil compositions, and more particularly to waxy mineral lubricating oils to which have been added a novel type of wax modifier or pour depressor.

Many different types of chemical compounds and reaction products have been used heretofore as pour depressors in waxy mineral lubricating oils to facilitate their flowing at very low temperatures, and frequently it is found that pour depressors having substantially different chemical structures have special advantages in some particular oil basestocks, or for use under some particular circumstances.

The product used according to the present invention, has been known per se heretofore, and has been used as plasticizer in synthetic rubber, but has never been known to have any wax modifying properties or to have been compounded with any paraffinic hydrocarbon oil basestock or other material in which this wax modifying characteristic would be used to advantage.

The wax modifying agent of this invention may be considered broadly to be a reaction product of an alkylated hydroxy hydrocarbon and an acetylene. The chemical reaction involved is believed to be a combination of alkylation and condensation. The invention is typified by the reaction product of para tert.-butylphenol and acethylene.

In place of the para tert.-butylphenol other alkyl phenols may be used having the general formula $$R_x.Ar(OH)$$

in which $R_x$ represents 1 to 4 alkyl groups having a total of about 3 to 30 carbon atoms, preferably about 4 to 20 carbon atoms and Ar represents an aromatic nucleus. Examples of these are para isopropyl phenol, para normal butyl phenol, ortho butyl phenol, meta butyl phenol, para isoamyl phenol, para.sec.-amyl phenol, para iso-octyl phenol, ortho para di-tert. butyl phenol, t-butyl beta naphthol, a para alkyl phenol in which the alkyl group corresponds to the mixed hydrocarbons in paraffin wax, as well as other commercially available materials such as mixed petroleum phenols having for instance an average of 4 or more alkyl carbon atoms.

In place of ordinary acetylene $C_2H_2$, other acetylenes can be used having the general formula Y.CCH, where Y represents either hydrogen or a lower alkyl group having 1 to 5 carbon atoms.

The proportions of these two reactants may vary somewhat, depending upon the precise nature of the condensation product desired as well as upon the reaction conditions used, but normally for each mol of alkyl phenol one should use about 0.5 mol to 3 mols, preferably 1 to 1.5 mols of the acetylene.

In view of the hazards in the use of acetylene, particularly under pressure, it is desirable to have it diluted with an inert gaseous material such as nitrogen, steam, methane, etc. preferably having the acetylene present in a concentration of about 1 to 30%, preferably about 10 to 25% by volume. An inert liquid diluent may also be used, if desired, such as n-hexane, petroleum ether, etc. The temperature used should normally be about 100° to 300° C. preferably 150° to 250 C. The pressure may range from 1 atmosphere to about 50 atmospheres, preferably about 5 to 20 atmospheres, and the reaction time may be as short as ½ hour or it may be as long as 20 hours or more, although normally about 1 to 5 hours is sufficient. It is desirable to exclude oxygen from the reaction equipment. It is desirable to use a catalyst for this reaction, and for this purpose one may use about 1 to 15% by weight, preferably about 2 to 10% by weight of various metal salts, such as, zinc, cadmium or other metal salts of organic acids such as oleic, linoleic, palmitic, stearic, acetic etc., as well as various metal resinates and metal naphthenates, e. g., a zinc salt of petroleum naphthenic acids.

The product resulting from the above-described reaction may be recovered, refined and fractionated or otherwise purified by various methods, as for instance vacuum distillation to remove low molecular weight solids or fractions, or by precipitation from a solvent solution, or by selective solvent extraction. The product which is normally a brittle solid and relatively non-tacky, may be considered to have the general formula $$[R_xAr(OH).C_2H_4—]n$$

in which $R_x$ represents 1–4 alkyl groups having a total of 3 to 30 carbon atoms, i. e., $x$ being 1–4, Ar represents an aromatic nucleus and $n$ indicates the degree of polymerization. The molecular weight of this product generally ranges from about 800 to 2000 or more. The Ubbelohde drop point, which is generally a little higher than the melting point, usually ranges from about 100° to 180° C., and preferably should be about 130°–160° C. This product is substantially saturated, and therefore relatively inert and stable, and in this respect has advantages for use in motor lubricating oils over certain other addition agents heretofore suggested as lubricating oil additives.

The above-described product has been found to be a valuable wax modifier, i. e., it has the ability to modify the crystal formation of paraffin wax and similar highly paraffinic hydrocarbons. Thus it can advantageously be added to waxy mineral lubricating oils in a concentration of about 0.1 to 10%, preferably about 0.5 to 5% by weight, as a pour depressor, i. e., for lowering or depressing the pour point of such oils, and for making them flow more readily at low temperatures, particularly below 0° F. The hydrocarbon oil basestock may not only be of the lubricating oil boiling range but also lower boiling fractions such as, gas oil, kerosene, etc., which are desirably used as basestock in the preparation of hydraulic oils and gun-recoil oils. This wax modifier may also advantageously be incorporated in paraffin wax per se, especially when it is to be used for hot melt wax coating of paper or other fabrics.

Other additives may be incorporated into the hydrocarbon compositions of this invention, such as for instance, small amounts of viscosity index improvers, e. g. polybutene, dyes, lubricity agents, extreme pressure lubricating agents, etc., as well as relatively larger amounts of metal soaps, e. g. 5 to 30% or so of sodium, calcium, aluminum, barium or other metal soaps of fatty acids or naphthenic acids when the product is to be used as a lubricating grease.

The lubricating oil compositions containing the alkylphenol-acetylene reaction product, have also been found to be surprisingly stable and resistant to oxidation, due to the incorporation of this reaction product. Accordingly, one aspect of the invention contemplates the use of the alkylphenol-acetylene reaction product as an antioxidant for various materials such as oils, waxes, substantially saturated polymeric materials, etc.

A still further variation of the invention is the treatment of this alkylphenol-acetylene type reaction product with a phosphorus sulfide such as $P_2S_5$, $P_4S_7$, $P_4S_3$, etc., to enhance its antioxidant properties, and if desired, to impart extreme pressure lubricating properties thereto.

The following example is given to illustrate the advantages and details of the invention, without, however, limiting the invention to the specific materials and conditions used.

An alkylphenol-acetylene reaction product was made by placing in a stainless steel autoclave an amount of tert.-butyl phenol corresponding to one mol, then passing nitrogen gas through the autoclave to remove oxygen, then heating the contents to about 210° C. and permitting the nitrogen pressure to build up to about 10 atmospheres, then charging acetylene into the autoclave until a pressure of about 15 atmospheres is reached, the amount of acetylene thus being used amounting to about 1.3 to 1.5 mols per mol of the alkylphenol. The reaction time was about 15 hours. The catalyst was a zinc naphthenate, which was used in a concentration of about 8.5% by weight based on the para tert.-butyl phenol or about 4% based on the total reactants. After the reaction was completed, nitrogen gas was blown through the autoclave to remove all residual acetylene; then the reaction product was removed. It was a brown, brittle resin when cooled.

The pour depressing properties of this resin may be judged from the following table showing both the A. S. T. M. pour point and the stable pour point (by the type V procedure as described in the June 24, 1943, issue of "Oil and Gas Journal" at page 43) for various concentrations ranging from 1 to 4% by wt. in a waxy mineral lubricating oil having a viscosity of about 43 seconds Saybolt at 210° F., and having a viscosity index of about 112, made by a solvent extraction of a petroleum lubricating oil basestock.

| Resin in Oil | Pour Point (ASTM) | Stable Pour Point (Type V) |
|---|---|---|
| Percent | °F. | °F. |
| 0 | +17 | +15 |
| 1 | −5 | −5 |
| 2 | −5 | −5 |
| 4 | −5 | −5 |

It is noted from the above data that 1%, 2% and 4% of the resinous reaction product lowered the A. S. T. M. pour point of the waxy mineral lubricating oil from +17° F. to −5° F. and lowered the stable pour point from +15° F. to −5° F. These results are quite unexpected, because heretofore no pour depressors had ever been made by this type of chemical reaction.

Although a general empirical formula is given for the final reaction product used as pour depressor according to this invention, the exact graphic configuration of the group shown as $.C_2H_4$— in the empirical formula is not known with certainty. It is believed to be —CH(CH$_3$)—.

It is not intended that the invention be limited to the specific materials which have been recited merely for the sake of illustration, but only by the appended claims in which it is intended to claim all novelty inherent in the invention as well as all modifications coming within the scope and spirit of the invention.

We claim:

1. A composition consisting essentially of a major proportion of a waxy mineral oil base stock, containing dissolved therein about 0.1 to 10% by weight of a resinous product having the general formula $$[R_xAr(OH).C_2H_4—]n$$

in which $R_x$ represents 1–4 alkyl groups having a total of 3 to 30 carbon atoms, i. e., $x$ being 1–4, Ar represents an aromatic nucleus and $n$ indicates the degree of polymerization, the resinous product having an average molecular weight of about 800 to 2000 and having a Ubbelohde drop point of about 100° to 180° C.

2. A composition as in claim 1 wherein $R_x$ represents a tert.-butyl and Ar represents a benzene ring.

DAVID W. YOUNG.
PAUL W. BRAKELEY, Jr.

REFERENCES CITED

The following references are of record in the file of this patent:

UNITED STATES PATENTS

| Number | Name | Date |
|---|---|---|
| 2,072,825 | Reppe | Mar. 2, 1937 |